United States Patent [19]
Fuser

[11] Patent Number: 5,634,674
[45] Date of Patent: Jun. 3, 1997

[54] CONNECTING DEVICE FOR AN END OF A RIGID METALLIC PIPE FOR CONVEYING A FLUID

[75] Inventor: Laurent Fuser, Annemasse, France

[73] Assignee: Parker Hannifin RAK SA, Annemasse, France

[21] Appl. No.: 383,048

[22] Filed: Feb. 3, 1995

[30] Foreign Application Priority Data

Apr. 2, 1994 [FR] France ................. 94 01533

[51] Int. Cl.$^6$ ................................. F16L 19/02
[52] U.S. Cl. ............. 285/353; 285/379; 285/336; 285/382; 285/349
[58] Field of Search ............... 285/382, 383, 285/386, 349, 379, 336

[56] References Cited

U.S. PATENT DOCUMENTS

| | | |
|---|---|---|
| 168,970 | 10/1875 | Caswell . |
| 676,846 | 6/1901 | Moran .................. 285/353 |
| 2,037,625 | 4/1936 | Goepel et al. ......... 285/353 |
| 2,131,509 | 9/1938 | Goepel et al. ......... 285/353 |
| 2,208,353 | 7/1940 | Woolley et al. ....... 285/379 |
| 2,867,463 | 1/1959 | Snider ................... 285/336 |
| 2,924,263 | 2/1960 | Landis . |
| 3,040,800 | 6/1962 | Hartley . |
| 3,042,965 | 10/1962 | Gray, Jr. et al. . |
| 3,092,404 | 6/1963 | MacWilliam . |
| 3,142,499 | 7/1964 | Lang .................... 285/379 |
| 3,207,537 | 9/1965 | Kimbrell et al. ..... 285/353 |
| 3,458,220 | 7/1969 | Rose et al. ............ 285/336 |
| 3,590,455 | 7/1971 | Harris . |
| 3,606,659 | 9/1971 | Robbins . |
| 3,610,016 | 10/1971 | Bultman . |
| 3,668,754 | 6/1972 | Boast . |
| 4,634,154 | 1/1987 | Arora et al. .......... 285/353 |
| 4,761,873 | 8/1988 | Wetzel et al. . |
| 4,765,661 | 8/1988 | Fukushima et al. . |
| 4,809,418 | 3/1989 | Burli . |
| 4,980,961 | 1/1991 | Caudill . |

FOREIGN PATENT DOCUMENTS 182486  2/1936  Switzerland .

Primary Examiner—Eric K. Nicholson
Attorney, Agent, or Firm—Christopher H. Hunter

[57] ABSTRACT

A connecting device comprises a connecting part (2) surrounding and fixed to the end of a tube (1). Connecting part (2) includes a ring-shaped hollow (5) at its downstream end. A flange (8) on th downstream end of the tube is located in hollow (5) and retains the connecting part (2). A ring-shaped groove (9) is also arranged at the downstream end of robe (1). Groove 9 is intended to receive a leakproof gasket (10). Assembly of the connecting part (2) onto the end of the tube (1) is carried out by means of a rivet snap tool (12). The tool (12) includes a support (13), a truncated central protrusion (14), and a rib (15).

21 Claims, 2 Drawing Sheets

1

CONNECTING DEVICE FOR AN END OF A RIGID METALLIC PIPE FOR CONVEYING A FLUID

FIELD OF THE INVENTION

The invention concerns a connecting device for one end of a rigid metal tube intended to transport a fluid, e.g., a liquid, vapor or gas.

BACKGROUND OF THE INVENTION

In transportation systems for fluids under pressure, the leakproof link between rigid metal tubes, or between a metal tube and the various openings of the devices in the system, is generally carried out with flanged connections. One type of flanged connection comprises an inside-shouldered nut which is fitted onto one of the tubes to be connected, with the nut being enclosed by the flange on the tube. A threaded adapter on the other tube receives the nut. A gasket is arranged in a ring-shaped groove on the front face of the adapter to provide a leakproof connection with the first tube.

The threaded adapter (which is part of the second tube) typically has a generally cylindrical shape, with an inner shoulder to receive the end of the second tube and an outside threaded portion. The threaded adapter is assembled to the second tube such as by brazing.

In order to carry out an assembly by brazing, it is necessary to prepare the parts to be assembled. These parts must be cleaned, degreased and polished to allow satisfactory adhesion of the filler metal. Then, for the actual brazing, it is necessary to heat the parts and to melt the brazing wire or the brazing ring. Following this operation, the brazed parts are cleaned and the brazing is inspected. All of these operations can be time consuming and expensive.

Also, it can be difficult to braze pans which have been treated against corrosion. This can be very inconvenient when the fluids being transported are corrosive fluids.

SUMMARY OF THE INVENTION

The purpose of the invention is to provide a connecting device between rigid metal tubes or between a metal tube and a device in a fluid transportation system where the connecting device is i) not susceptible to an anti-corrosion treatment, ii) is simple and economical to manufacture.

To this end, the connecting device includes a connecting pan surrounding and fixed to the end of a tube. The connecting part includes, on the front face at the tube end side, a ring-shaped hollow opening. A flange is provided on the tube which forms a ring-shaped protuberance on the outside surface. The tube flange is received within the ring-shaped hollow in the connecting part to secure the tube to the connecting part. A ring-shaped groove, intended to receive a leakproof O-ring gasket, and one wall of which is defined by the internal face of the hollow opening in the connecting part, is defined at the end of the tube. The front wall of the connecting part which forms the ring-shaped groove preferably includes a radially-inward directed lip intended to hold the gasket in the groove. The O-ring gasket ensures a leak-proof connection with another tube or device in the fluid transportation system. The invention also provides a method for forming the above-described connecting device. This method consists of:

fitting a connecting part having a ring-shaped hollow on its inside face, onto the end of a tube in such a manner that the ring-shaped hollow faces the distal end of the tube, having the distal end of the tube extend beyond the front face of the connecting part, tightening the connecting part on the tube by means of holding jaws, introducing into the tube, that is, into the end which is surrounded by the connecting part, a truncated central projection of a snap, the snap comprising a support from which the truncated central projection protrudes, and the projection having a diameter at the base approximately equal to the inner diameter of the tube, the snap also having a ring-shaped rib surrounding the truncated central projection which is concentric to the projecting and has an outside diameter at most equal to the diameter of the connecting part's ring-shaped hollow, actuating the snap with an orbital oscillating movement in order to deform the tube wall and push the tube back towards the inside of the connecting part's ring-shaped hollow, and causing the truncated central projection of the snap to enter into the tube, until the rib of the snap pushes back the metal of the tube which is inside the hollow towards the bottom of the hollow in order to form a ring-shaped groove at the end of the tube.

The shape of the projection rib determines the shape of the ring-shaped groove obtained, and therefore depends on the type of gasket intended to be fitted in this groove. For example, for an O-ring gasket, the ring-shaped rib of the snap comprises an outside wall which is approximately parallel to the axis of the snap, a frontal wall which is approximately perpendicular to this axis, and an inside wall in the shape of truncated cone, the top of which is on the opposite side of the tube.

If the connecting port has a radially-inward directed lip to maintain the gasket in the groove, the front surface of the connecting part, located on the side of the ring-shaped hollow, has the shape of a truncated cone, the top of which is outside the connecting part and on the side of the ring-shaped hollow. When the rib of the snap forms the ring-shaped groove, the support of the projection deforms the connecting part's front surface and forms a radial lip on the outside periphery of the ring-shaped groove. However, it is also possible to obtain a radial lip in the connecting part by machining.

In any event, the invention will be easily understood upon reviewing the following description, as reference to the appended schematic drawings which, as a non limiting example, shows one form of implementation of this connecting device and various steps which illustrate the preferred implementation process for this device.

DETAILED DESCRIPTION OF THE PREFERRED EMBODIMENT

Figure 1:
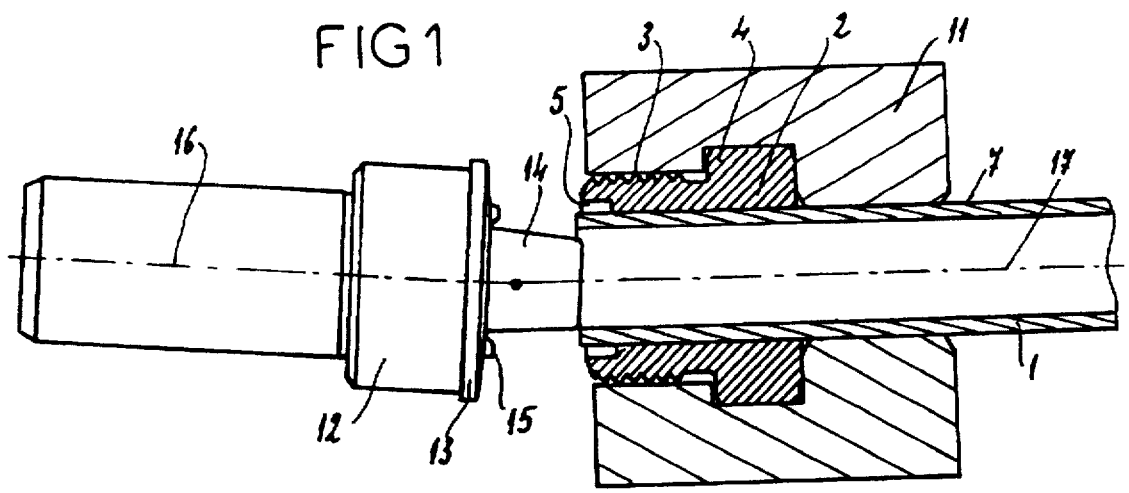
FIG. 1 illustrates a first step in the process to implement a connecting device according to the invention, with the connecting device shown in longitudinal section.

Referring to the drawings, a metal tube to be connected according to the principles of the present invention is indicated at 1. FIGS. 1–5 shown in succession the manner of forming a connecting device with tube 1. To this end, a connecting part 2 is provided surrounding the downstream end of tube 1. The connecting part 2, on its outside surface, has a threaded part 3 and a six-sided flanged part 4. Threaded part 3 is intended to receive a nut, which is not shown, with threading of the same pitch and fixed to a second tube by means of a flange arranged at the end of the second tube. The six-sided part 4 makes it possible to tighten the nut securely onto the threaded part by making it possible to firmly hold connecting part 2 by means of an appropriate wrench.

Connecting part 2 is also equipped with an axial bore. The bore has a diameter equal to the outside diameter of tube 1. Connecting part 2 also includes a ring-shaped hollow 5, arranged in its bore at the downstream end of connecting part 2 facing the distal end of the tube. The hollow 5 includes a lip 6 (FIGS. 4, 5) which extends radially inward towards the axis of connecting part 2. Lip 6 is formed at the downstream end face of the connecting part around the entire circumference of hollow 5.

Figure 3:
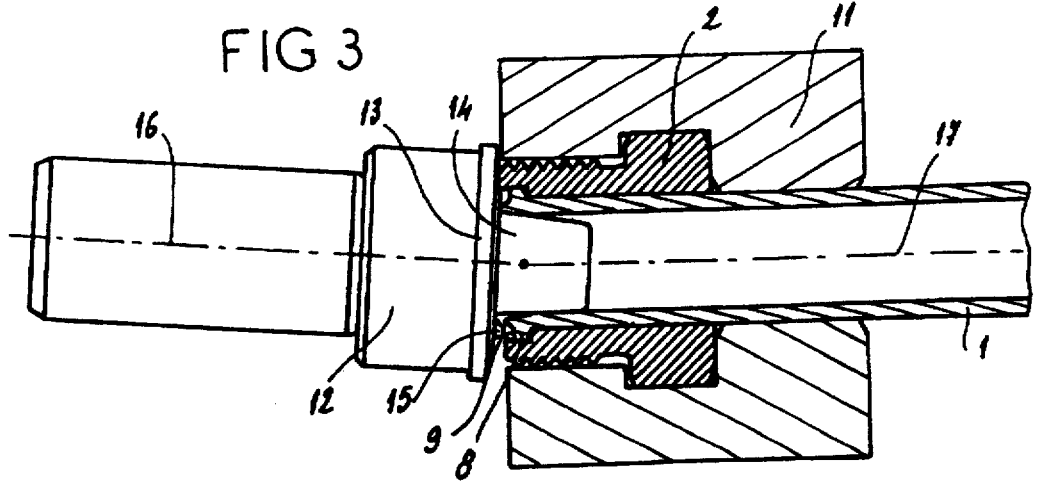
FIG. 3 illustrates a third step in the process.
Figure 4:
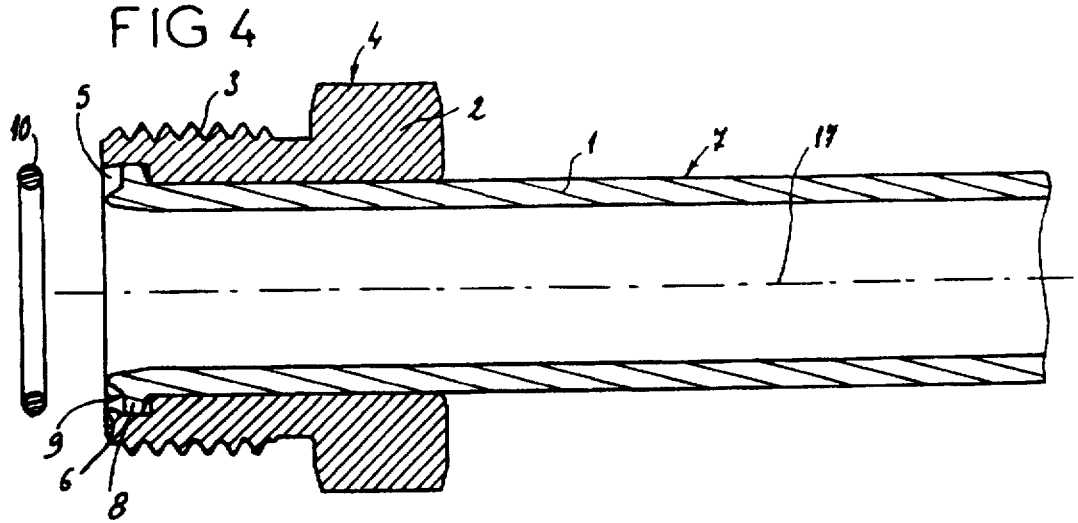
FIG. 4 in enlarged scale, shows a connecting device according to the invention and an O-ring, according to the same section plan as the preceding figures.

The outside surface 7 of tube 1 has an annular flange 8 at the distal downstream end of the tube. Flange 8 fits in the ring-shaped hollow 5 of connecting part 2. The outside diameter of flange 8 corresponds to the inside diameter of ring-shaped hollow 5. At the end of tube 1, on its downstream front face, is also a ring-shaped groove or channel 9 (FIGS. 3, 4). The outside diameter of groove 9 is defined by the inside wall of connecting part 2. The upstream end surface of the groove 9 is defined by the downstream wall of flange 8, and the inside diameter of groove 9 is defined by the outside surface of tube 1.

Figure 5:
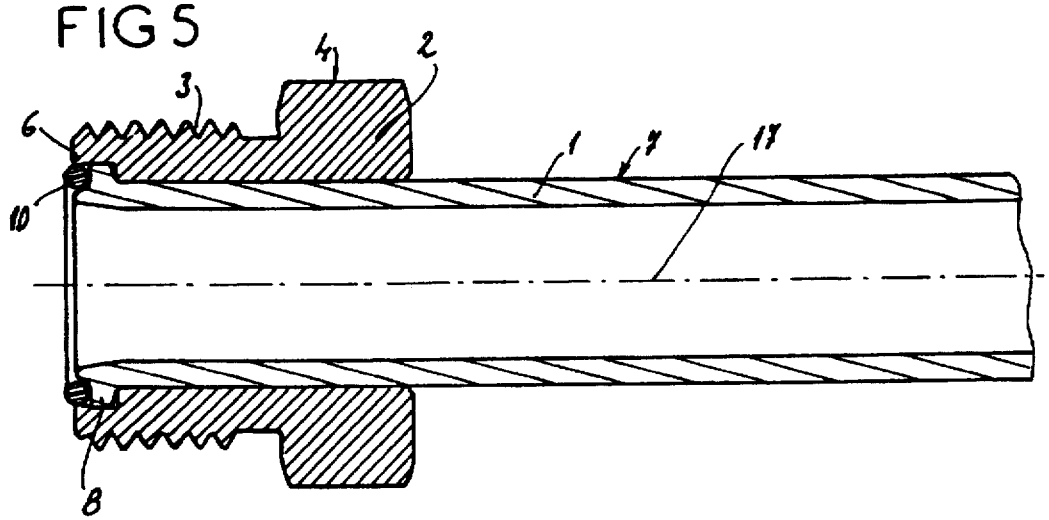
FIG. 5 is a view similar to FIG. 4 but with the O-ring installed.

An O-ring gasket 10 is located in groove 9 against ring-shaped flange 8, as shown on FIGS. 4 and 5. Lip 6 holds this gasket 10 in position in groove 9.

Before assembly, tube 1 and connecting part 2 have shapes which are slightly different from those described above. As shown in FIG. 1, tube 1 initially has a hollow cylindrical shape. Its downstream end does not initially have a flange, nor a groove. Connecting part 2 also does not initially include a lip, rather its front surface, on the side of ring-shaped hollow 5, has the shape of a truncated cone, with the top of this cone located on the axis of connecting part 2 outside the latter and on the side of ring-shaped hollow 5.

According to the invention, ring-shaped flange 8 and groove 9, at the downstream end of tube 1, are formed by a rivet snap tool 12. To this end, connecting part 2 is fitted onto tube 1 such that the ring-shaped hollow 5 is facing the distal end of the tube. Threaded part 3 of connecting part 2 also faces the distal end of the tube, while flanged part 4 is upstream of threaded part 3. Connecting part 2 is positioned on tube 1 in such a manner that the end of tube 1 extends beyond connecting part 2. In this position, the tube/part assembly is introduced into holding jaws 11, the inside profile of which corresponds to the outside profile of the tube/part assembly. Connecting part 2 is tightened on tube 1 by holding jaws 11.

Forming can then start. A tool 12, called a rivet snap, is used. Tool 12 comprises a support 13 which has a truncated projection 14 at its center. Truncated projection 14 has an axis perpendicular to support 13. At the base of projection 14, that is, where projection 14 attaches to support 13, the diameter of projection 14 is approximately equal to the inside diameter of tube 1. The diameter of projection 14 narrows down as it extends away from support 13. A rib 15, which protrudes on the same face of support 13 as projection 14, is concentrically arranged with respect to projection 14.

The outside diameter of rib 15 is slightly smaller than the outside diameter of ring-shaped hollow 5 of connecting part 2. The outside wall of rib 15 is approximately parallel to the axis of the snap, while the front wall of rib 15 is approximately perpendicular to the axis of the snap. Further, the inside wall of rib 15 is in the shape of a truncated cone, the top of which is on the axis of the tool on the opposite side of tube 1.

Figure 2:
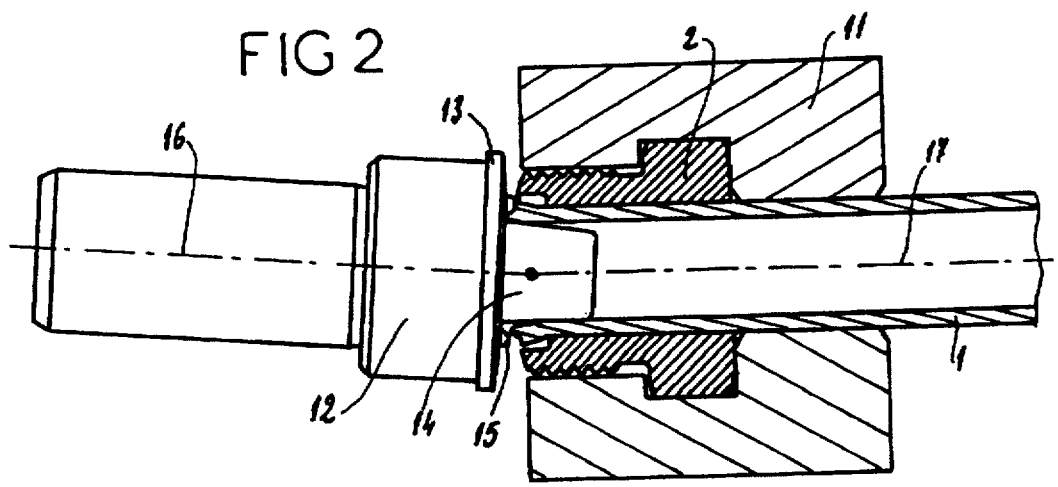
FIG. 2 illustrates a second step in the process.

As shown in FIG. 2, the central projection 14 of snap 12 is introduced into the tube, on the side where the connecting part 2 is located. As is general knowledge, axis 16 of snap 12 is driven by its tool support so as to describe a cone (orbit) around axis 17 of tube 2 and to be displaced in the direction of tube 1.

As the snap is orbited on its tool support (which is not shown on the drawing), according to general knowledge by means of ball bearings or similar bearings, central projection 14 deforms the end of tube 1 by pushing the walls of the tube radially outward. Rib 15 on the snap also pushes the tube walls axially towards the bottom of hollow 5 simultaneously forming ring-shaped groove 9, as shown on FIGS. 2 and 3. At this point, tube 1 is fixed to connecting part 2. When support 13 comes into contact with the front face of connecting part 2, it rolls without sliding on this face but pressing on it and deforming it, until it forms lip 6.

Following the completion of the snapping operation, snap 12 is removed. The connecting device as described above is therefore complete. It is only necessary to remove tube 1 from the holding jaws, to place O-ring 10 in ring-shaped groove 9, and then to connect tube 2 to another tube (or device) which is equipped with a nut.

This process of fixing connecting part 2 on tube 1 does not require any special preparation of the parts, can be performed on tubes which have been subjected to surface treatment, and is economical.

Of course, the invention is not limited to the preferred execution and implementation process described above as an example; on the contrary, it includes all the variants. For example, the connecting part 2 is not necessarily a threaded part with a six sided flange part. Rather, the connecting part may be any part which allows connection, as for example a bushing with a locking system by means of bayonet or pawl and ratchet mechanism.

In the same manner, the outside deformation of the tube with a view to its becoming part of the connecting device may be obtained not by snapping, but by means of other cold mechanical deformation operation. Finally, lip 6 which holds O-ring 10 may be obtained by machining.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

I claim:

1. A connecting device for one end of a rigid metallic tube intended to carry liquid, comprising a connecting part with a central bore which surrounds the end of the tube and which is fixed on the tube, said connecting part including a ring-shaped hollow opening toward the end of the tube and opening into the bore, inside of which is located a flange of the tube forming a ring-shaped projection on its outside surface holding the connecting part fixed to the tube, said connecting part also including a ring-shaped groove disposed at the end of the tube, said ring-shaped groove designed to receive a gasket, and one wall of which is constituted by a wall of the hollow opening in the connecting part, and wherein the wall of the connecting part defining the ring-shaped groove includes a radial lip toward the end of the tube intended to hold the gasket in the groove.

2. The connecting device as in claim 1, further including a resilient gasket disposed within said ring-shaped groove.

3. The connecting device as in claim 1, wherein the connecting part includes a threaded part on an outside surface.

4. A connecting device for one end of a rigid metallic tube, the connecting device comprising:

a cylindrical rigid metallic tube having an annular flange toward an end of the tube, and a connecting part with a central bore, said connecting part receiving the end of the tube within the central bore and being fixedly secured to the end of the tube, said connecting part including a ring-shaped hollow on an end of the connecting part which opens into the central bore, said tube flange being received within said ting-shaped hollow and engaging the portion of the connecting part defining said ring-shaped hollow, said tube flange and ring-shaped hollow also defining a ring-shaped groove at the end of the connecting part, and an O-shaped gasket disposed within said ring-shaped groove, said connecting part and said tube flange having complimentary structure comprising a radially-inward directed lip at the end of said connecting part which retains said gasket within said ring-shaped groove.

5. A connecting device for one end of a rigid metallic tube intended to carry liquid, comprising a connecting part with a central bore which surrounds the end of the tube and which is fixed on the tube, said connecting part including a ting-shaped hollow opening toward the end of the tube and opening into the bore, inside of which is located a flange of the tube forming a ring-shaped projection on its outside surface holding the connecting part fixed to the tube, said tube flange having an outside diameter which is in radial compression against the inside diameter of the portion of the connecting part forming said ring-shaped hollow to prevent rotation thereof, said connecting device also including a ring-shaped, groove, disposed at the end of the tube, said ring-shaped groove designed to receive a gasket, and one wall of which is constituted by a wall of the hollow opening in the connecting part, wherein said flange on said tube is formed by mechanically deforming said tube radially outward into engagement with the portion of said connecting part forming said ring-shaped hollow.

6. The connecting device as in claim 5, wherein said tube flange includes a radially-outward extending end wall defining an upstream end surface of the ring-shaped groove.

7. The connecting device as in claim 6, wherein said radially-outward extending end wall of said tube flange extends adjacent to a radially-inward extending end wall of said connecting part forming said ring-shaped hollow.

8. The connecting device as in claim 7, wherein said tube has a distal end portion extending axially outward away from said flange and forming an axially-extending inside surface of said ring-shaped groove.

9. The connecting device as in claim 8, wherein said wall of the hollow opening in the connecting part extends in radially-outward spaced relation to said distal end portion of said tube and forms an axially-extending outside surface of said ring-shaped groove.

10. The connecting device as in claim 9, wherein said connecting part and said distal end of said tube have cooperating structure which engages and gasket and retains said gasket within said ring-shaped groove.

11. The connecting device as in claim 10, wherein said cooperating structure comprises a radially-inward directed lip at the end of said connecting part.

12. The connecting device as in claim 11, wherein said outside diameter of said tube flange is greater than an inside diameter of said connecting part lip.

13. The connecting device as in claim 1, wherein said tube flange has an outside diameter which is greater than an inside diameter of said connecting part lip.

14. The connecting device as in claim 4, wherein said flange on said tube is formed by mechanically deforming said tube radially outward into engagement with the portion of said connecting part forming said ring-shaped hollow.

15. The connecting device as in claim 14, wherein said tube flange has an outside diameter which is in radial compression against the inside diameter of the portion of the connecting part forming said ring-shaped hollow to prevent relative rotation thereof.

16. The connecting device as in claim 15, wherein said tube flange includes a radially-outward extending end wall defining an upstream end surface of the ring-shaped groove.

17. The connecting device as in claim 16, wherein said radially-outward extending end wall of said tube flange extends adjacent to a radially-inward extending end wall of said connecting part forming said ring-shaped hollow.

18. The connecting device as in claim 17, wherein said tube has a distal end portion extending axially outward away from said flange and forming an axially-extending inside surface of said ring-shaped groove.

19. The connecting device as in claim 18, wherein said wall of the hollow opening in the connecting part extends in radially-outward spaced relation to said distal end portion of said tube and forms an axially-extending outside surface of said ring-shaped groove.

20. The connecting device as in claim 14, wherein said outside diameter of said tube flange is greater than an inside diameter of said connecting part lip.

21. The connecting device as in claim 4, wherein said tube flange has an outside diameter which is greater than an inside diameter of said connecting part lip.

* * * * *

UNITED STATES PATENT AND TRADEMARK OFFICE
CERTIFICATE OF CORRECTION

PATENT NO. : 5,634,674
DATED : June 3, 1997
INVENTOR(S) : Laurent Fuser

It is certified that error appears in the above-indentified patent and that said Letters Patent is hereby corrected as shown below:

Column 5, line 22, delete "ting-shaped" and insert therefore--"ring-shaped".

line 38, delete "ting-shaped" and insert therefore--"ring-shaped".

Signed and Sealed this

Twenty-sixth Day of August, 1997

Attest:

BRUCE LEHMAN

Attesting Officer    Commissioner of Patents and Trademarks